United States Patent Office

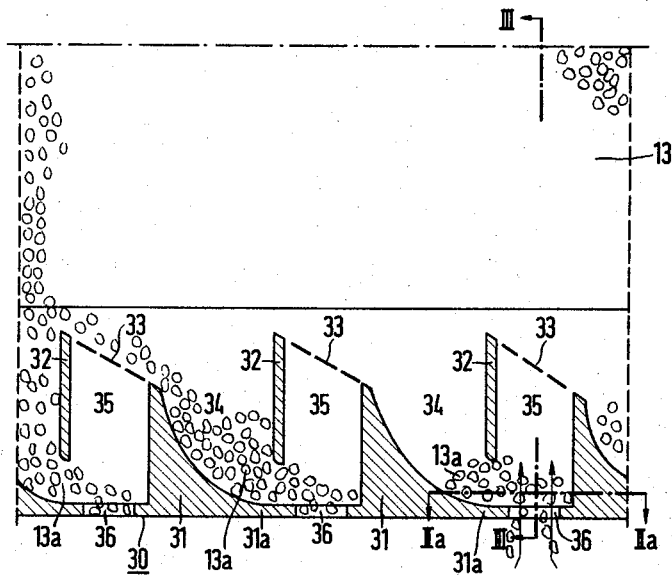
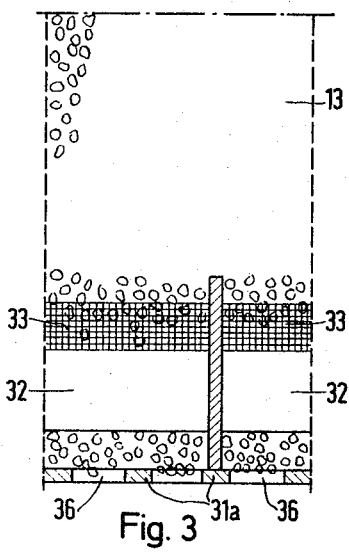
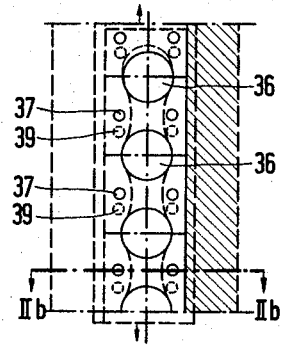
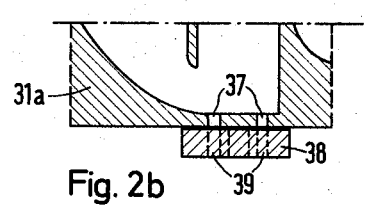
Fig. 2
Fig. 3
Fig. 2a
Fig. 2b

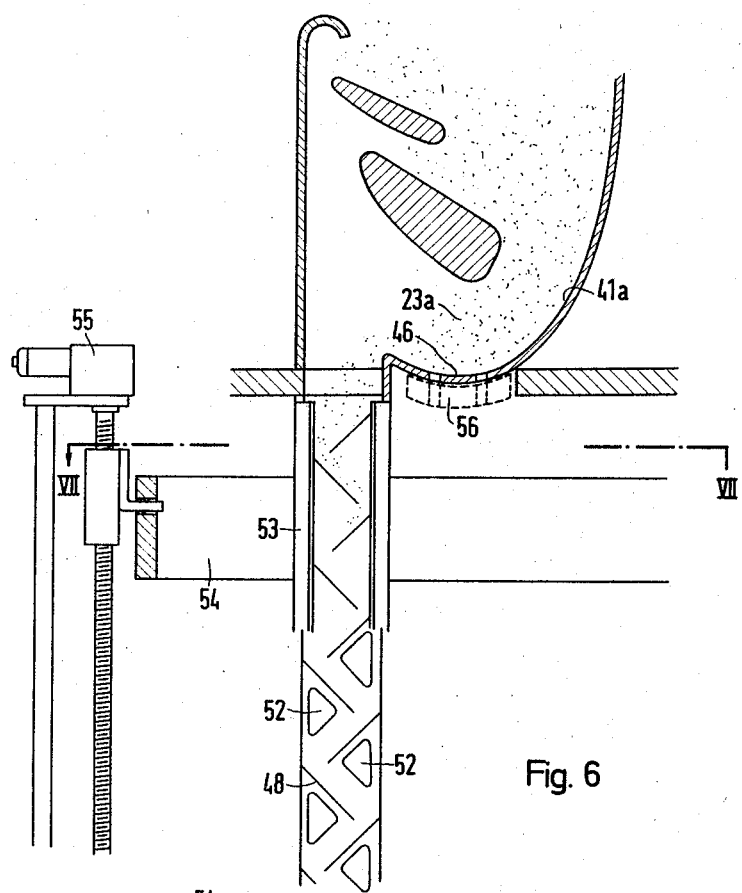
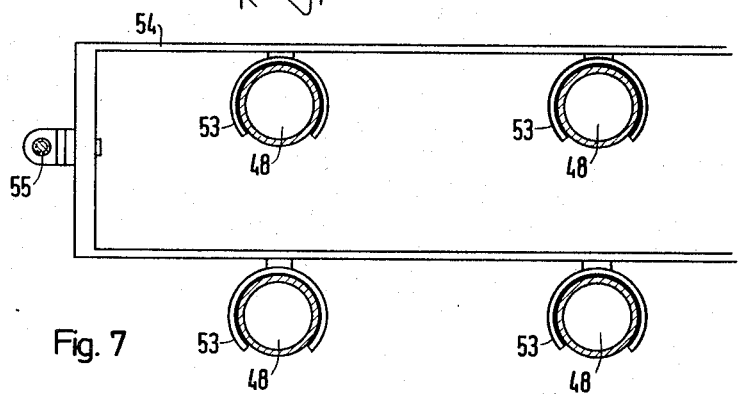

3,305,939
Patented Feb. 28, 1967

3,305,939
APPARATUS FOR CONTACTING GAS WITH PARTICLE MATERIAL IN COUNTERFLOW
Hans Sonnenschein and Karl-Heinz Schnug, both of Mulheim (Ruhr), Germany, assignors to Siemens-Schuckertwerke Aktiengesellschaft, Erlangen, Germany, a corporation of Germany
Filed Mar. 30, 1964, Ser. No. 355,885
Claims priority, application Germany, Mar. 30, 1963, S 84,482; Jan. 14, 1964, S 89,051
18 Claims. (Cl. 34—54)

Our invention relates to apparatus, such as heat exchangers or chemical processing equipment, in which a gas passes through a mass of particle material.

It is known that heat exchangers operating with solid mass particles as heat carriers, and chemical plants in which a gaseous medium passes through a layer of fine-granular particles, for example catalyst material, afford optimal heat-exchanging or contacting conditions if the particles move downwardly by gravity and the gaseous medium passes upwardly through the flow of particles.

If the layers of mass particles thus traversed by gas are relatively thin in the flow direction of the particles but possess a large area dimension perpendicular to the travel directions of gas and mass particles, there arises the difficult problem of securing and maintaining a uniform movement of all mass particles in the large area of the layer, particularly at low particle throughputs.

It has been proposed, for throughput regulation of the mass particles, to provide reciprocable gratings or tiltable grate members, and to vary their moving speed for correspondingly controlling the particle flow. This, however, involves considerable difficulties as to construction, operation and maintenance, particularly for operation at high temperatures and large particle-layer areas.

It is therefore an object of our invention to devise apparatus for the counterflow contacting of gas with particle material that afford controlling and regulating the flow of mass particles from the gas-traversed particle layer, without the necessity of employing movable gratings, grating members or similar equipment, thus simplifying the control operations at the most critical locations and securing a higher degree of reliability even with expansive layers of particle material or at high temperatures of contacting operation.

According to our invention, we provide a counterflow apparatus for gas and particle material with a throughput control device which comprises a layer-supporting channel-bed structure in the form of a horizontal partition having wall portions which subdivide the layer space into particle collecting chambers with respective outlets that permit the formation of "reposing wedges." That is, the particle material draining from each chamber through the outlet forms adjacent to the chamber a wedge-shaped slope or tongue corresponding to the angle of repose. The partition structure is further provided with perforated or otherwise gas-permeable bottom portions through which the gas can pass upwardly into and through the reposing wedges of particle material so that the particle material, when fluidized by the ascending gas, can drain from the wedges to the space below the channel-bed structure. The amount of particle material thus drained is dependent upon the partial flow of gas that passes upwardly through the gas-permeable portions, so that a control or regulation of the draining particle quantity is afforded by correspondingly varying the amount of the gas flow.

For reliably securing the desired control of the frictional or fluidizing conditions in the reposing wedges of material and simultaneously providing for the required passage of gas through the mass particle layer, it is preferable to provide the horizontal partitioning channel-bed structure with vertical wall portions which subdivide it in a number of particle chambers and adjacent gas chambers, the particle chambers being upwardly open for receiving particle material from above, and the adjacent gas chambers being permeable to the gas flow but substantially closed upwardly to ingress of particle material. That is, the above-mentioned bottom openings or gas-permeable bottom portions of the structure are located in respective gas chambers, and the reposing wedges of particle material extending from the respective outlets of the adjacent particle chambers protrude into the gas chambers above the bottom openings or gas-permeable portions.

When respective partial currents of gas pass from below through the reposing wedges, the friction between the mass particles in the reposing wedges is reduced and the material thus fluidized can drain or trickle off. As long as such a gas flow is absent, however, the mutual friction between the mass particles is too large to permit a flow of particle material. The invention therefore permits controlling or regulating the quantity of the draining mass particles within wide limits even when the throughput of particles is small, by correspondingly varying the intensity of the gas flow passing through the reposing wedges of material formed in the channel-bed structure upon which the particle layer is supported. Such a control or regulation of the particle throughput can be effected simply by providing a gas-flow control member, for example a slide valve or the like, in the gas supply conduit or, preferably, by connecting to the main gas conduit a shunt or bypass line with a control valve.

According to another feature of our invention, a change in particle throughput can also be effected by selectively impeding or preventing the passage of gas through individual portions of the mass particle layers separated by partitions from the rest of the layer. As a result, an increase in gas flow is abruptly initiated in the other portions of the layer, and the drainage of mass particles is correspondingly reduced or stopped in the layer portions now taken out of the gas flow.

The flow characteristics can also be modified by means of displaceable sliders which control respective slots in the wall portions of the partitioning channel-bed structure and thereby vary either the quantity of gas passing through the above-mentioned reposing wedges or the quantity of gas flowing through separate passages in the structure at localities not covered by the reposing wedges. A simultaneous control and regulation of the different partial gas currents passing through the respective reposing wedges or particle drainage channels is likewise applicable.

The invention is particularly well suited for heat exchangers of the regenerator type having two heat exchanger chambers sequentially traversed by a circulating flow of mass particles which carries heat from a gas flow passing through one chamber to a different gas flow passing through the other chamber. Referring to such a heat exchanger, it is particularly advantageous to embody the invention in such a manner that the throughput regulating device in the one regenerator chamber where cold mass particles are heated by hot gas, has a drooping characteristic, whereas the throughput regulating device in the other regenerator chamber where cold gas is heated by the mass particles previously heated in the other regenerator chamber, has an ascending characteristic. This provision of regulating devices having respectively different throughput characteristics affords various regulating advantages, particularly if the mass particle throughput in the two regenerator chambers is to be conjointly regulated for maintenance of the same flow quantities in both chambers.

The above-mentioned particle-throughput regulation performance can be automatically controlled by varying the quantity of the gas supply in dependence upon the level of particle material in a conduit connecting the two regenerator chambers so that, by virtue of the different, namely ascending and descending, characteristics, a departure from the datum value of the particle level in the connecting conduit causes a change in gas supply which then increases the particle throughput for one regenerator chamber and simultaneously decreases the throughput for the other in the sense required to eliminate the departure.

The above-mentioned and more specific objects, advantages and features of our invention, said features being set forth with particularity in the claims annexed hereto, will be described in, and will be apparent from, the following, with reference to the embodiments illustrated by way of example on the accompanying drawings in which:

FIGS. 2 and 3 show in section respective portions of the mass-particle layer and the supporting channel-bed structure, FIG. 3 being a section along the line X—X in FIG. 2.

FIG. 2a shows a different section of the channel-bed structure in somewhat modified form but corresponding essentially to the section along the line Z—Z in FIG. 2; and FIG. 2b is a section along the line Y—Y in FIG. 2a.

FIG. 6 is a sectional side view and FIG. 7 a sectional top view of another channel-bed structure and accessory equipment comprising an additional throttling device for the gas flow.

FIG. 8b is a section taken at a right angle to that shown in FIG. 8a.

Figure 1:
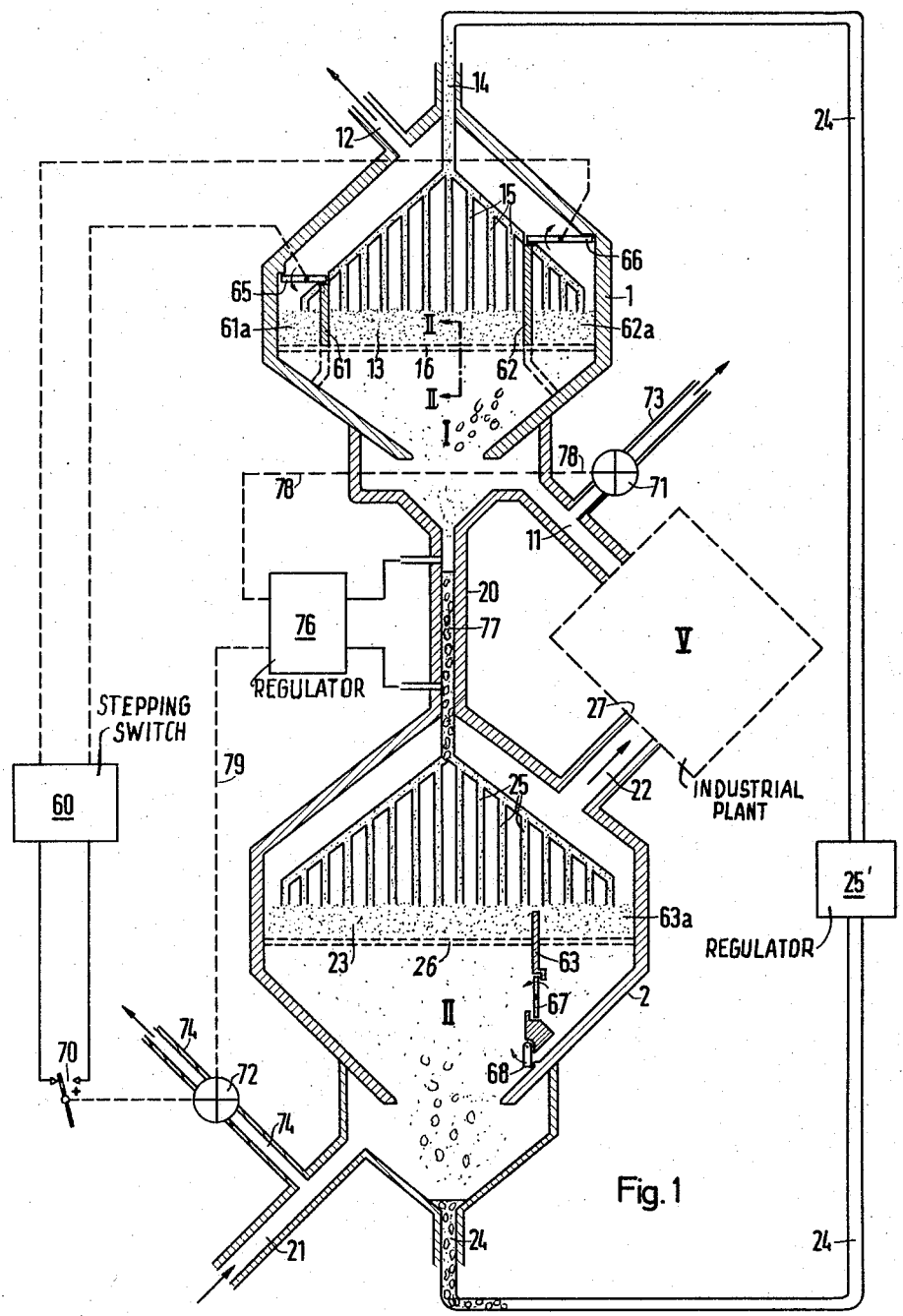
FIG. 1 shows schematically a vertical section through a two-chamber regenerator for heat exchange between two gaseous media.

The regenerator shown in FIG. 1 comprises an upper regenerator chamber I in which a downward flow of mass particles is heated by an upward flow of gas, and a lower regenerator chamber II for heating an ascending cold gas flow by a downward flow of heated mass particles. The regenerator chambers are enclosed in heat-insulating housings 1 and 2 respectively. The bottom of the upper housing 1 is connected with the top of the lower housing 2 by a particle transfer conduit 20 whose length, shown shortened for the purpose of illustration, is sufficiently long so that the column of mass particles draining through the conduit 20 forms a trap mutually sealing the two regenerator chambers I and II in which respectively different pressures may obtain. The hot gas, such as air, is supplied from below into the upper regenerator chamber I through a conduit 11 and leaves the top portion of the chamber through an outlet conduit 12. The cold gas enters into the bottom portion of the lower chamber II from a supply conduit 21 and leaves the top portion of chamber II through an outlet conduit 22. The ascending quantity of gas in each chamber passes through a particle layer 13, 23 within which the heat exchange with the respective gases takes place.

The mass particles, consisting of quartz sand, steel granules (steel sand), ceramic particles or the like, are circulated through the two regenerator chambers. They enter at 14 through a distributor channel assembly 15 which distributes them onto the layer 13. After the particles trickle through the layer 13, they pass through the connecting conduit 20 and a distributor assembly 25 into the particle layer 23 of chamber II. After trickling out of this layer, the particles pass through a circulating duct 24 and an impeller 25′ back into the particle inlet 14 of the regenerator chamber I.

For securing in the laterally expansive particle layers 13 and 23 a given particle throughput, the layers are supported by respective channel-forming partition structures 16 and 26 which have openings and chambers capable of regulating the passage of the mass particles and gases therethrough as will be described presently with reference to FIGS. 2 and 3.

As shown in FIGS. 2 and 3 for particle layer 13, the channel-bed structure 16 which supports the layer has a number of parallel, upwardly extending wall portions 31 consisting of highly temperature-resistant material such as corundum, silicon carbide or other ceramic material. Inserted between each two parallel wall portions 31 are vertical inserts 32 which partition the space between each two wall portions 31 into an upwardly open chamber 34 for receiving particle material from above, and a gas chamber 35. Each gas chamber 35 is upwardly closed by a foraminous or other gas-permeable member 33 which is covered by the mass particles of layer 13 but does not permit them to pass through, while gas may penetrate from the chamber 35 upwardly through the cover member 33 and the particle layer above. The wall portions 31 have laterally protruding parts 31a which extend beneath the adjacent gas chambers 35, and the vertical partitions 32 have a bottom outlet opening through which the particle material from chamber 34 can drain into the gas chamber 35 so as to form on top of the projection 31a a "reposing wedge" i.e. a wedge-shaped tongue whose slope corresponds to the angle of repose. The projecting portions 31a are perforated by openings 36 at the bottom of the gas chambers 35, and the reposing wedges of particle material issuing from the chambers 34 extend over the openings 36. When the material in the wedges is fluidized by the currents of gas passing upwardly through the openings 36 into the gas chambers 35 and through the permeable cover members 33 into and through the layer 13, some of the particle material from the wedges will trickle through the openings 36 and the wedges are then continuously replenished by particle material draining from the chambers 34. The openings 36 are so dimensioned that when the reposing wedges 13a are formed on the protruding portions 31a, the friction between the particles of the wedge suffices to wholly or substantially prevent drainage of particle material through the opening 36 as long as no gas or only a negligible quantity of gas flows upwardly through the opening 36. For example, with a circular shape of the openings 36 they can be given a diameter somewhat more than twice, preferably 2.2 times, the grain size or diameter of the particle material. When the openings 36 have square shape, the side length of the square need only be slightly more than twice the grain diameter of the particle material.

If a sufficient pressure difference between the spaces above and below the particle layer causes an appreciable amount of gas to pass through the openings 36, the partial gas currents penetrating through the respective reposing wedges decrease the friction between the particles, thus fluidizing the particle material to a greater or lesser extent and loosening or even whirling it somewhat up in the gas chambers 35. Some amount of particle material will now drain from the reposing wedges through the openings 36 into the chamber space below the partitioning channel-bed structure. The intensity of this particle flow depends upon that of the gas flow passing through the respective openings 36.

In apparatus according to the invention, the particular manner in which the total flow quantity of the particle material through a layer varies in dependence upon a variation in gas flow constitutes the "throughput characteristic" and can be represented in a coordinate graph by plotting the particle current as a function of the gas quantity passing through a particle layer. We have discovered that the throughput characteristic can be modified by applying respectively different designs to the channel-bed structure on which the particle layer is supported. This will be explained presently.

In the apparatus described above with reference to FIGS. 2 and 3, one and the same group of bottom openings 36 in the channel structure 16 serves to permit drainage of the fluidized material from the reposing wedges and also constitutes the only passages available for the gas to pass through the particle layer after fluidizing the material in the wedges. We have found that with such a design the regulation obtained by varying the gas-flow quantity exhibits a descending throughput characteristic. That is, this characteristic has a drooping range in which the flow of mass particles draining through the openings decreases with increase of the gas quantity passing through the reposing wedges.

Figure 10:
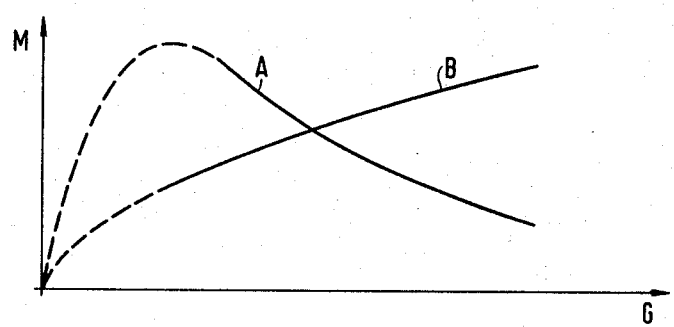
FIG. 10 is an explanatory graph representing particle-mass throughput characteristics of devices according to FIGS. 2, 3 and 4, 5.

Such a throughput characteristic of the apparatus according to FIGS. 2 and 3 is exemplified by curve A in the graph shown in FIG. 10. The ordinate indicates the quantity M of mass particles per unit time draining from the layer, and the abscissa indicates the gas quantity G flowing per unit time. Tests made with apparatus according to the invention have shown that in the stable range above a given gas throughput, the particle throughput decreases with increasing gas quantity along a continuously descending portion of the characteristic A, this portion being shown by a full line. By virtue of this drooping characteristic, the apparatus affords the possibility of self-regulation for uniform dwell time in the event of disturbances due to changes in layer thickness. This comes about as follows.

When during operation the gas speed increases locally, for example due to local reduction in layer thickness, the particle throughput at this locality becomes reduced in accordance with the characteristic of curve A in FIG. 10. The resulting reduction in particle speed or the shortened travel path at this locality establishes the same particle dwell time within the layer as it obtains in the adjacent localities of larger layer thickness. Analogously, at localities where the gas speed has become too low because of an increase in layer thickness, the throughput is accelerated. This mutually opposed action in the event of locally reduced or increased gas speeds has the over-all effect of maintaining the dwell time and throughput values substantially uniform over the entire horizontal expanse of the particle layer. The stabilizing effect is particularly augmented in a particle layer traversed by gas which arrives in hot condition and is being cooled as it passes through the layer.

The section according to FIG. 2a shows a modification in comparison with FIG. 2. Aside from the openings 36 described above, the modified structure according to FIG. 2a is provided with additional side channels or slots 37 whose width is smaller than the grain size so that only the gas can pass through, thus increasing the partial gas quantity that passes through the reposing wedges. The amount of gas additionally admitted through the channels 37 can be controlled by flat sliders 38 having openings or slots 39 (FIG. 2b). By shifting the slider 38 from one to the other position, the channels 37 in the projecting portions 31a can be opened or closed.

The throughput regulating device according to FIGS. 2 and 3, with or without the modification shown in FIGS. 2a and 2b, can be used in each of the two regenerator chambers I and II of the apparatus illustrated in FIG. 1. However, some purposes make it preferable to operate at least one of the two throughput regulating devices with a throughput characteristic of a behavior fundamentally different from the one explained above with reference to curve A in FIG. 10.

Particularly desirable in this respect is a throughput characteristic of particle flow versus gas flow that exhibits a continuously ascending configuration so that an increase in gas flow is accompanied by an increase in particle flow.

According to the invention, a characteristic of this kind can be obtained by providing the channel-bed structure with drainage openings or channels for the particle mass in addition to, or separate from, the gas-permeable portions or openings through which the ascending gas flow fluidizes the reposing wedge of particle material. The design of such a structure is preferably such that the reposing wedge of particles changes its angle of repose as a result of the reduction in internal friction or fluidization caused by the passage of gas, and can then flow past an overflow edge. Such a device affords modifying the throughput characteristic by virtue of the fact that a portion of the gas flow passes through the particle drainage channels without affecting the reposing wedges, in parallel relation to those partial gas quantities that do pass through the reposing wedges. The flow of gas through the separate particle drainage channels can be reduced or modified by increasing the gas-flow resistance in these channels. A throughput regulating structure of this type affords operating with an ascending particle throughput characteristic under conditions where a relatively cold quantity of gas is heated in a relatively hot layer of mass particles to a sufficiently higher temperature to cause an appreciable increase in gas volume.

Figure 4:
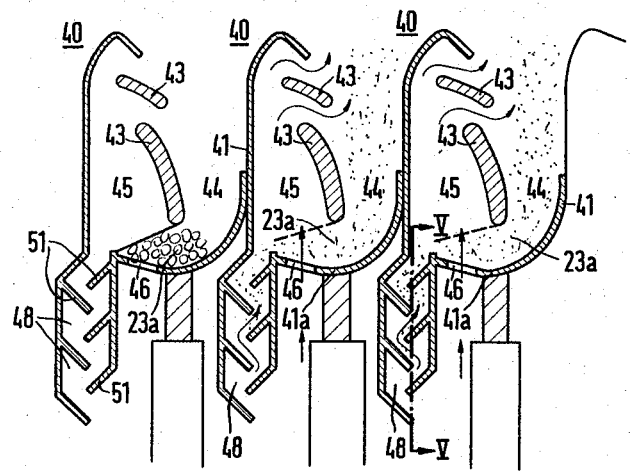
FIGS. 4 and 5 are sectional views, corresponding as to the viewing directions to FIG. 2 and 3 respectively, but relating to a modified embodiment of a channel-bed structure for supporting the particle layer in apparatus according to the invention.
Figure 5:
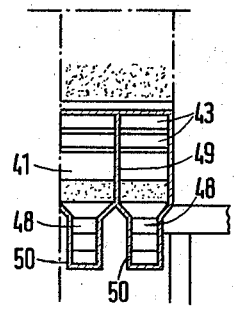

The throughput regulating channel-bed structure illustrated in FIGS. 4 and 5 affords an operation with a characteristic of the latter type.

An essential feature of the channel-bed structure 40 shown in FIGS. 4 and 5 as compared with the one described above with reference to FIGS. 2 and 3 is the fact that it is not only provided with openings 46 for the passage of gas through the reposing wedges of particle material (corresponding to the openings 36 in FIG. 2) but also with separate outlet channels 48 for the drainage of particles from the wedge when the latter is fluidized by the gas flow.

The channel-bed structure 40 consists of sheet steel and is provided with laterally projecting portions 41a in which the respective openings or slots 46 are located and which during operation permit the formation of the reposing wedges of particle material. The space between adjacent wall portions 41 is subdivided by gas-permeable inserts 43 into a particle inlet chamber 44 (corresponding to the chamber 34 in FIG. 2) which communicates with the particle layer 23 (FIG. 1) above the structure, and a gas chamber 45 (corresponding to 35 in FIG. 2).

The lateral projections 41a of wall portions 41 and the respective reposing wedges 23a extend into the bottom space of the gas chamber 45 and terminate with an overflow edge at the top opening of a particle drainage channel 48.

The regulating function of the device is as follows.

When no gas is supplied through the slot openings 46, the slope of the wedges 23a is relatively steep corresponding to the normal angle of repose of the particle material. Under these conditions, schematically represented in the left-hand pair of chambers 44, 45 (FIG. 4), the particle material cannot pass beyond the overflow edge of the projection 41a into the drainage channel 48. However when, due to a pressure difference between the regenerator chambers, a gas flow passes through the slots 46, the friction between the individual mass particles is considerably reduced depending upon the intensity of the gas current. This changes the angle of repose, and the particles can now pass from the reposing wedges 23a over the overflow into the drainage channels. This effect is shown in the right-hand portion of FIG. 4. The slots 46 can be kept sufficiently narrow to substantially prevent mass particles from passing through. However, without fundamental change in functioning, the slots 46 may also be given larger dimensions so that some escape of mass particles through these openings remains possible, this being preferable to prevent clogging of the slots.

For impeding or preventing excessive escape of gas through the particle drainage channels 48, they are provided with downwardly inclined inserts 51 alternately extending from different sides of the channel toward each other into overlapping relation. The inserts 51 do not interfere with the trickling of mass particles from the channel-bed structure but sufficiently throttle the partial gas currents passing upwardly through the drainage channels 48.

In the embodiment shown in FIGS. 6 and 7, the cylindrical or prismatic drainage channels 48 are provided with lateral openings 52 for permitting the inflow of gas. These openings can be closed to a greater or lesser extent by means of displaceable ring-type sliders 53 for adjusting or modifying the throttle resistance to the flow of gas through the particle drainage channels 48.

FIG. 7 shows more in detail the sliders 53 of several parallel drainage channels 48 mounted on a common frame 54 which is displaceable upwardly or downwardly by means of a spindle drive 55 for the above-mentioned control purposes.

If desired, a device according to FIGS. 4 and 5 may also be provided with additional control members, for example slider-type wall portions, for varying the size of the slots 46 to thereby control or change the partial gas currents passing through the reposing wedges 23a of particle material. Such a flat slider 56 with slots is shown in FIG. 6. It permits placing the slots more or less in registry with the slots 46 for thereby controlling the supply of gas to the reposing wedge 23a.

As is apparent from the cross section according to FIG. 5, the channel-bed structure composed of the wall portions 41 and the inserts 43 is further subdivided by transverse partitions 49 extending perpendicularly to the plane of illustration. The shape of the wall members 50 that form the drainage channels 48 is adapted to this transverse subdivision.

Figure 8A:
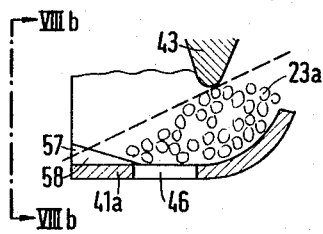
FIG. 8a is a lateral view of a particle outlet portion at which a reposing wedge of material is formed in apparatus otherwise similar to that shown in FIG. 4.
Figure 8B:
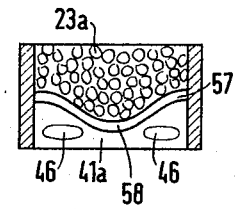
Figure 9A:
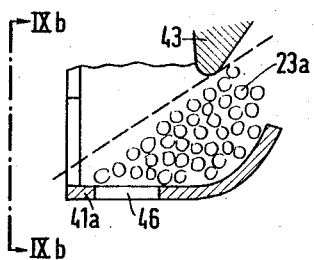
FIGS. 9a and 9b show respective sectional views of another modification relating to a portion of the apparatus otherwise corresponding to the one shown in FIGS. 8a and 8b.
Figure 9B:
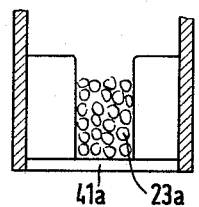

As mentioned, an apparatus according to the invention permits keeping the particle throughput very small. For this purpose in devices according to FIGS. 4 and 5 it is preferable to give the projections 41a of the wall portions 41 in the channel-bed structure a particular design as exemplified by FIGS. 8a and 8b. According to this embodiment, the projections 41a are provided with two mutually spaced raised parts 57 at their overflow edge, a groove 58 being formed between the raised parts. FIGS. 9a and 9b show a somewhat different design in which transverse vertical wall parts 59 of substantially rectangular shape are located at the overflow edge in spaced relation to each other so that an intermediate drainage gap 60' remains between them.

In FIG. 10, curve B exemplifies the throughput characteristic of a regulating device according to FIGS. 4 and 5 for a heat-exchanging operation in which the particle layer increases the temperature of the gas passing therethrough. The quantity of particles being drained off per unit time increases with an increase in gas quantity. This has the consequence that under the just mentioned operating conditions a self-regulating performance can be obtained in the event of local changes in the particle layer. That is, the flow of particles is automatically equalized over the entire extent of the layer by virtue of the following phenomena. When as a result of a change in layer thickness, for example a reduction in thickness, a change in pressure gradient and a corresponding increase in gas flow take place, an increase in drainage of particles from the layer tends to occur. Now, however, the wedge is replenished by a larger amount of hot particles so that the flow resistance increases correspondingly, thus preventing an appreciable disturbance of the heat-exchanging operation.

As mentioned above, the invention affords controlling the particle throughput in a simple manner for varying the gas flow passing through the particle layers. A convenient way of doing this is by means of bypass lines equipped with valves or the like control members and branching off the gas supply ducts. It is further possible to interrupt the gas flow and consequently the particle throughput in individual sections of the layers by provision of partitions or other separator members, thereby changing to a great extent the flow and throughput in the other portion of the particle layer. In this manner, the water value $M \cdot c$ of the particle flow quantity can be adapted to the water value $G \cdot cp$ of the gas flow. Also applicable is an area adaptation of the particle layer in the event of changes in gas flow quantities.

An example of automatically regulating the particle throughput on such principles will be described presently with reference to the regenerator apparatus illustrated in FIG. 1.

For the purpose of favorable regulating conditions the regenerator chamber I is provided with a channel-bed structure 16 with a drooping characteristic (curve A in FIG. 10) as described above with reference to FIGS. 2 and 3, whereas the zone II is provided with a channel-bed structure according to FIGS. 3 and 4 having an ascending characteristic corresponding to curve B in FIG. 10.

Both chambers I and II are provided with partitions 61, 62 and 63 to permit sections 61a, 62a and 63a to be separated from the rest of the gas flow in the particle layer. These separable sections are equipped with their own respective gas supply spaces, and the gas supply to these spaces can be stopped by means of rotatable cover plates 65, 66, 67 of the butterfly-valve type. Shown at 68 in chamber II is a check valve of the flap type which prevents the entrance of gas but permits drainage of particles from the lower section 63a separated from the rest of the layer 23 by the partition 63.

To afford a regulation of the particle flow for preventing operational disturbances by correspondingly adapting the throughput values in accordance with the characteristic A of FIG. 10 in chamber I and in accordance with characteristic B of FIG. 10 in chamber II, the gas supply conduits 11 and 21 are provided with respective bypass lines 73 and 74 each closed by a control valve 71 or 72. By means of these controllable bypasses, namely by varying the flow cross-section in valves 71 and 72, the amount of gas supplied to the channel-bed structures 16 and 26 can be varied.

The valves 71 and 72 in the bypass lines are actuated by valve drives (not shown) controlled from a regulator 76. The regulator receives pulses in dependence upon the level of the particle column 77 in the connecting conduit 20 between the regenerator chambers I and II. The pressure in the column 77 within conduit 20 can be taken as a measure of the just mentioned level, this being the case in the illustrated example because the drop in pressure measured at two points along the particle-filled conduit 20 is proportional to the length of the particle column. If desired, the level-responsive pulses may be produced in any other suitable manner, for example with the aid of a beam of light passing through a transparent portion of the conduit 20, or with the aid of other radiation passing through the conduit, and acting upon photoelectric or corresponding transducer cells.

When the level of particle material in the conduit 20 drops below a given value, the gas escape valves 71, 72 in the branch lines 73, 74 are controlled by the regulator 76 through control lines 78, 79 to increase the valve opening, thus reducing the gas flow passing through the regenerator chambers. Hence, the quantity of particle drainage changes in accordance with the characteristic of the throughput regulating devices. That is, by increasing the flow cross section of valve 71 in line 73, the gas supplied through the regenerator chamber I of the illustrated apparatus is reduced and therefore the particle throughput increased according to characteristic A in FIG. 10. Simultaneously, the opening of valve 72 reduces the gas supply to chamber II so that the particle throughput in this chamber is also reduced in accordance with characteristic B of FIG. 10. In this manner the different characteristics are both utilized for an effective and rapid regulation to equalize the respective particle throughputs in the two chambers.

The regulation can also be made more effective by interrupting in regenerator chamber I the flow of gas through selected layer sections, thus also reducing the flow of particles in these sections. This is done by correspondingly actuating the stop valve members 65, 66.

The control of the stop members 65, 66 can also be effected in dependence upon the level of the particle column in connecting conduit 20. Such an automatic control is effected by a stepping switch 60. A pulse switch 70 is connected with a regulator-controlled drive of valve 72. The switch 70 is designed and operative in the manner of a telephone dial switch and thus, during rotational operation of the valve 5, repeatedly engages the contact denoted by a plus sign (+), each time advancing the stepping switch 60 one step. When the level of the particle column in conduit 20 first drops below a given minimum value, the selector position of the switch 60 is such as to actuate the stop member 65 which then closes the section 61a of the particle layer 13 from the gas supply. When the level again drops and a second pulse from switch 70 is issued to stepping switch 60, the valve flap 66 of section 62a is closed.

The regulating system thus operates by having a bypass valve 71, 72 effect a fine regulation which varies the quantity of the gas flow supplied to the regenerator chambers, whereas an additional coarse regulation is effected by the disconnection of sections from the particle layer 13. If desired, the flow of gas through the section 63a in particle layer 23 can also be stopped during the course of the regulating performance.

Schematically shown in FIG. 1 is an industrial plant V, for example a furnace plant, interposed between the gas outlet conduit 22 of regenerator chamber II and the gas inlet conduit 11 of chamber I. In this particular application, the plant V receives a current of air through the inlet conduit 21 of chamber II. The air is preheated in chamber II and is further heated by operation of the plant V before it is discharged through the regenerator chamber I. Therefore, essentially the same current of air passes through the two regenerator chambers and the plant. In such cases it is often sufficient if the air quantity passing through both regenerator chambers is regulated only by opening a valve 72 in the bypass or branch-off line of the supply conduit 21. However even in such cases it is sometimes desirable to additionally provide for stopping the gas flow from individual sections of the particle layer by means of such stop members as shown at 65 and 66.

To those skilled in the art it will be obvious upon a study of this disclosure that our invention permits of various modifications and can be given embodiments other than particularly illustrated and described herein, without departing from the essential features of our invention and within the scope of the claims annexed hereto.

We claim:

1. Apparatus for passing gaseous medium through a particle mass, comprising gas flow means and particle duct means having a counterflow path in common in which path the gas flow has an upward and the particle travel a downward direction, a fixed structure extending through said counterflow path transversely of said direction, said structure being adapted to support a layer of said particle material, said structure having upwardly extending wall portions which form mutually adjacent interstitial particle chambers and gas chambers, said particle chambers having means for being upwardly open to receive particles and having respective outlets near the chamber bottom, said gas chambers being substantially closed to ingress of particle mass from above and being permeable to gas at the top and bottom, said gas-permeable bottom being adjacent and below one of said outlets and adapted to be normally covered in said gas chamber by a reposing wedge of particle material drained from said outlet, whereby the flow of particle mass from said wedges through said structure is controllable by variation of the gas flow.

2. Apparatus for passing gaseous medium through a particle mass, comprising gas flow means and particle duct means having a counterflow path in common in which path the gas flow has an upward and the particle travel a downward direction, a fixed structure extending through said counterflow path transversely of said direction and having openings for the passage of gas and particle mass, said structure adapted to support a layer of said particle material, said structure having upwardly extending wall portions which form mutually adjacent interstitial particle chambers and gas chambers, said particle chambers having means for being upwardly open to receive particles and having respective outlets near the chamber bottom, said gas chambers being substantially closed to ingress of particle mass from above but being permeable to gas flow and having in their respective bottoms an opening for entrance of gas from below, said opening being slightly larger than the particle size to permit downward passage of particle mass only when the mass is fluidized by passage of gas, said opening being adjacent and below one of said outlets and adapted to be normally covered in said gas chamber by a reposing wedge of particle material drained from said outlet, whereby the flow of particle mass through said openings is controllable by variation of the gas flow.

3. Apparatus for passing gaseous medium through a particle mass, comprising gas flow means and particle duct means having a counterflow path in common in which path the gas flow has an upward and the particle travel a downward direction, a fixed structure extending through said counterflow path transversely of said direction and having openings for the passage of gas and particle mass, said structure being adapted to support a layer of said particle material, said structure having upwardly extending wall portions which form mutually adjacent interstitial particle chambers and gas chambers, said particle chambers having means for being upwardly open to receive particles and having respective outlets near the chamber bottom, said gas chambers being substantially closed to ingress of particle mass from above but being permeable to gas flow and having in their respective bottoms an opening for entrance of gas from below, said openings being located near said respective outlets and having a width slightly larger than twice the grain diameter of the mass particles, whereby said openings are substantially closed, when the gas flow is zero, by a reposing wedge of particle material drained from said outlet.

4. Apparatus for passing gaseous medium through a particle mass, comprising gas flow means and particle duct means having a counterflow path in common in which path the gas flow has an upward and the particle travel a downward direction, a fixed structure extending through said counterflow path transversely of said direction and having openings for the conjoint passage of gas and particle mass, said structure being adapted to support a layer of said particle material, said structure forming upwardly open chambers to receive particle mass, said chambers having lateral outlets located near the chamber bottoms and upwardly adjacent to said openings, the particle mass drained through said outlets forming a reposing wedge above said gas openings, and control means forming part of said gas flow means for varying the gas flow through said reposing wedges of particle material.

5. Apparatus according to claim 2, comprising a processing container having its interior horizontally subdivided by said structure into an upper and a lower space, said openings adapted to be covered by said reposing wedges of particle mass forming jointly the only communication for gas and particle mass between said upper and lower spaces.

6. Apparatus according to claim 2, comprising a processing container subdivided by said structure into an upper and a lower space, and gas passages provided in said structure beside said openings and forming additional communications between said upper and lower spaces for increasing the gas flow, said passages having a cross section smaller than the grain size of the particles, and said openings having a larger cross section so as to permit the passage of particles from said reposing wedge when the latter is fluidized by gas flow.

7. Apparatus for passing gaseous medium through a particle mass, comprising gas flow means and particle duct means having a counterflow path in common in which path the gas flow has an upward and the particle travel a downward direction, a fixed structure extending through said counterflow path transversely of said direction, said structure being adapted to support a layer of particle material, said structure having upwardly extending wall portions which form mutually adjacent interstitial particle chambers and gas chambers, said particle chambers having means for being upwardly open to receive particles and having respective outlets near the chamber bottom, said gas chambers being substantially closed to ingress of particle mass from above but being permeable to gas flow and having a gas-permeable bottom for the passage of gas, said bottom being adjacent to said outlet and adapted to be covered by a reposing wedge of particle material drained from said particle chamber, said bottom having an overflow edge spaced from said outlet, and drainage channel means extending downwardly from said overflow edge to drain particle mass from said reposing wedge when gas passes through said permeable bottom to fluidize the particle material in said wedge.

8. In apparatus according to claim 7, said wall portions and gas-chamber bottoms being formed of sheet metal, and said bottoms having openings between said outlet and said overflow edge to provide for permeability to gas, said openings being narrow so as to substantially retain said particle material.

9. In apparatus according to claim 7, said drainage channel means comprising particle trap means for impeding gas flow through said channel means.

10. In apparatus according to claim 7, said drainage channel means comprising inwardly projecting insert spaced vertically from each other and transversely overlapping each other for repeatedly deflecting the particle drainage path to increase the resistance to upward flow of gas through said channel means.

11. Apparatus according to claim 6, comprising controllable closure means for adjustably covering said gas passages to vary the gas flow.

12. In apparatus according to claim 7, said bottom being upwardly inclined from said outlet toward said overflow edge.

13. In apparatus according to claim 7, said bottoms extending substantially horizontally, and two upward projections spaced from each other at the overflow end of said bottom and forming between each other a gap having said overflow edge.

14. Apparatus according to claim 1, comprising a processing container having its interior subdivided by said structure into an upper and a lower space, said gas flow means comprising a gas supply conduit communicating with said lower space of said chamber, and gas-flow control means connected with said supply duct.

15. In apparatus according to claim 14, said gas-flow control means comprising a bypass branching off said gas supply duct, and a gas-flow control valve in said bypass.

16. Apparatus for passing gaseous medium through a particle mass, comprising two enclosures forming respective regenerator chambers and being vertically spaced from each other with an intermediate particle-mass transfer conduit extending from the bottom of the upper to the top of the lower chamber; gas-conduit means serially interconnecting said two regenerator chambers and comprising a cold-gas inlet in the bottom portion of said lower chamber and a gas outlet in the top portion of said upper chamber; particle-mass circulation means forming in said two regenerator chambers a downward gravity path for particles including said intermediate transfer conduit for heat exchange from gas to mass in the upper chamber and from mass to gas in the lower chamber; particle-throughput regulating partition structure extending horizontally through said respective regenerator chambers, each of said structures being adapted to be covered by a layer of particle material and forming upwardly open particle-receiving compartments having lateral outlets through which the particle mass may drain and form a reposing wedge of particle mass, said structure being gas permeable beneath the localities of said reposing wedges for fluidizing the material therein when gas passes through said regenerator chamber so as to cause particle material to drain from said wedge into the bottom portion of the regenerator chamber; said regulating structure in said upper regenerator chamber having a negative characteristic of particle flow versus gas flow, said regulating structure in said lower chamber having a positive characteristic; and means for controlling the gas flow through said gas conduit means.

17. Apparatus according to claim 16, comprising sensing means responsive to the level of particle material in said transfer conduit and connected to said control means for varying the gas flow in dependence upon changes of said level.

18. In apparatus according to claim 16, said regulating structure in said upper regenerator chamber having said gas-permeable localities formed by openings which form passages for gas as well as for particle material, and said regulating structure in said lower regenerator chamber having said gas-permeable localities substantially impermeable to particle material and having separate particle drainage channels for draining gas-fluidized material from said reposing wedges.

References Cited by the Examiner

UNITED STATES PATENTS 2,639,973   5/1953   Fritz _____ 34—10 X

FREDERICK L. MATTESON, JR., *Primary Examiner.*

WILLIAM F. O'DEA, *Examiner.*

J. J. CAMBY, *Assistant Examiner.*